US010096968B1

(12) United States Patent
Fernandez et al.

(10) Patent No.: US 10,096,968 B1
(45) Date of Patent: Oct. 9, 2018

(54) OPTICAL FREQUENCY COMB LOCKING SYSTEM

(71) Applicant: Raytheon Company, Waltham, MA (US)

(72) Inventors: Javier H. Fernandez, El Segundo, CA (US); Todd O. Clatterbuck, Los Angeles, CA (US); Andrew N. Daniele, Granada Hills, CA (US); Michael S. Lackey, Torrance, CA (US); Darcy Bibb, Torrance, CA (US); Chon Thai, El Segundo, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 15/621,569

(22) Filed: Jun. 13, 2017

Related U.S. Application Data

(60) Provisional application No. 62/516,188, filed on Jun. 7, 2017.

(51) Int. Cl.
*H01S 3/13* (2006.01)
*H01S 3/11* (2006.01)

(52) U.S. Cl.
CPC .............. *H01S 3/13* (2013.01); *H01S 3/1109* (2013.01)

(58) Field of Classification Search
CPC ....... H01S 3/13; H01S 3/1109; H04B 10/695; H04B 10/69; H04B 10/66; H04B 10/60; H04B 10/6911
See application file for complete search history.

(56) References Cited

U.S. PATENT DOCUMENTS

| 8,488,639 B1* | 7/2013 | Diels | H01S 3/10092 372/13 |
| 2007/0086713 A1* | 4/2007 | Ingmar | G02F 1/365 385/122 |

OTHER PUBLICATIONS

"Dual Phase Locking System", Stable Laser Systems, (Apr. 1, 2016), 1 pg.
"Frequency Combs: Inherently CEP-stable", TOPTICA Photonics, (Sep. 15, 2016), 10 pgs.
"SmartComb: Compact Optical Frequency Comb", MenloSystems, (Dec. 14, 2016), 2 pgs.

* cited by examiner

*Primary Examiner* — Ted Wang
(74) *Attorney, Agent, or Firm* — Schwegman Lundberg & Woessner, P.A.

(57) ABSTRACT

Generally discussed herein are systems, devices, and methods for locking an optical frequency comb. A device may include comb error measurement and control circuitry to receive a beat tone and carrier envelope offset of an optical frequency comb and provide a fast and slow repetition rate control and a fast and slow carrier envelope offset control. The repetition rate controls and carrier envelope offset controls to control actuators of an optical frequency comb generator.

21 Claims, 6 Drawing Sheets

OPTICAL FREQUENCY COMB LOCKING SYSTEM

CROSS-REFERENCE TO RELATED APPLICATION

This patent application claims the benefit of U.S. Provisional Patent Application No. 62/516,188, filed Jun. 7, 2017, entitled "OPTICAL FREQUENCY COMB LOCKING SYSTEM", which is incorporated by reference herein in its entirety.

TECHNICAL FIELD

Embodiments discussed herein relate to devices, systems, and methods for controlling optical frequency combs.

BACKGROUND

Optical frequency combs have been used as a precision measurement tools, at least in part, because optical frequency combs may be used to accurately measure drifts and/or frequency of high frequency light waves. Optical frequency combs have been used to generate ultra-low phase noise microwaves, which require locking an optical frequency comb to an optical frequency reference. Typically, this has been done using large laboratory systems.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments or examples discussed in the present document.

DETAILED DESCRIPTION

Embodiments in this disclosure generally relate to generation of optical frequency combs.

Optical frequency combs may be used to generate ultra-low phase noise microwave signals, however, in order to do so they need to be finely controlled, or locked. Optical frequency combs may have two degrees of freedom. The first degree of freedom may be a repetition frequency, or repetition rate. The repetition rate controls the spacing between the teeth of the comb as well as the breadth of the comb. The second degree of freedom may be the carrier envelope offset. The carrier envelope offset shifts the frequency of the optical frequency comb teeth. In order to keep the optical frequency comb locked to a continuous-wave stable optical reference, the control system may control the two degrees of freedom by regulating two signals generated from the optical frequency comb, the beat tone and the carrier envelope offset frequencies. The beat tone corresponds to the repetition rate the carrier envelope offset frequencies correspond to an offset from a nominal frequency (e.g., zero).

This control has typically been done using large laboratory systems that take up a lot of space and use a lot of power. One or more embodiments allow the control to be implemented in a much smaller and use less power than these large laboratory systems. In some embodiments, the control system discussed herein may be implemented on a single field-programmable gate array (FPGA), an application specific integrated circuitry (ASIC) chip, a system on a chip (SoC), or the like, such as may be mounted on a printed circuitry board (PCB).

Figure 1:
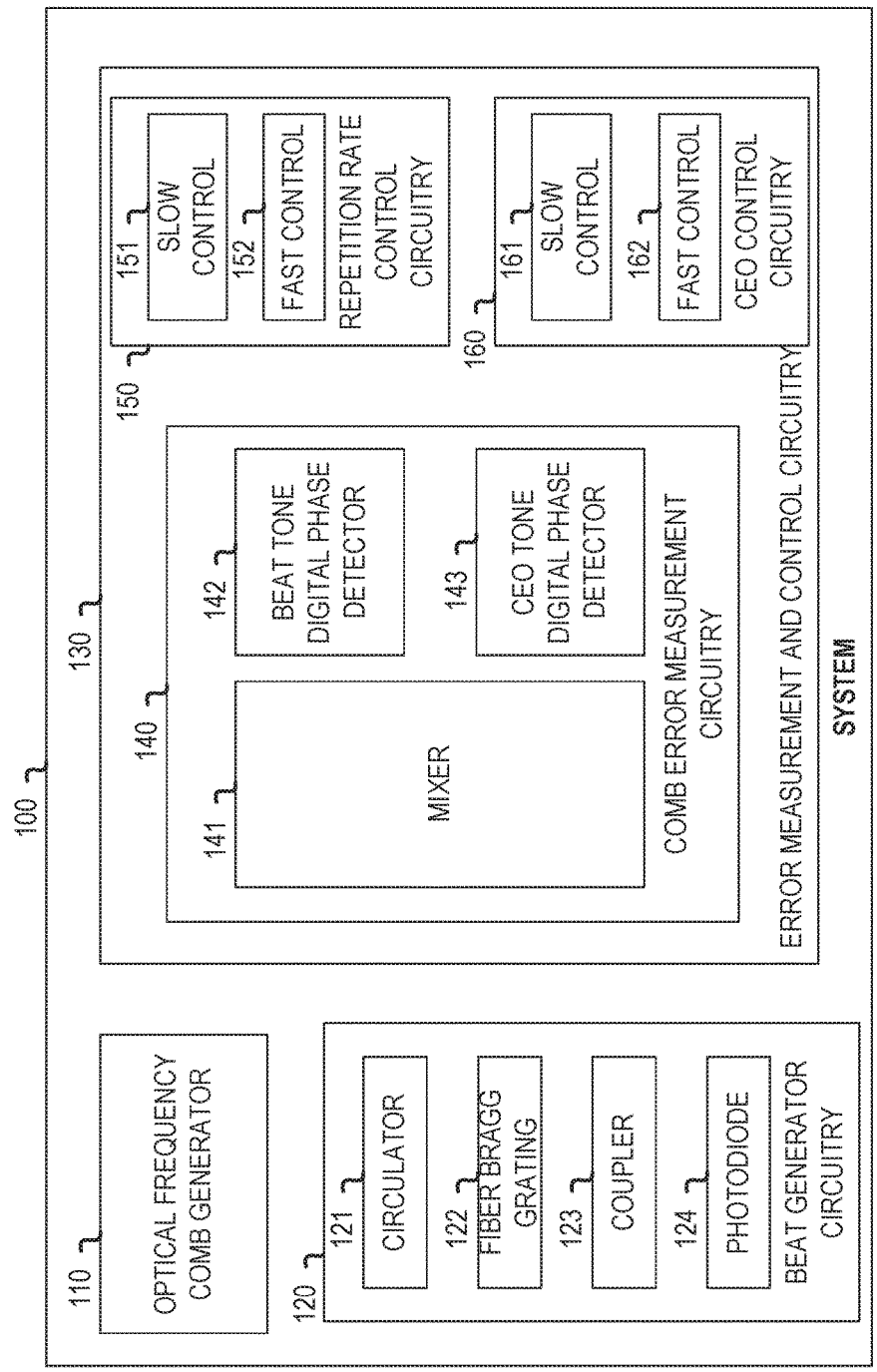
FIG. 1 illustrates, by way of example, a block diagram of an embodiment of a system for optical frequency comb generation and control.

FIG. 1 illustrates, by way of example, a block diagram of an embodiment of a system 100. The system 100, in one or more embodiments, may be for generation and control of an optical frequency comb. The system 100 as illustrated includes an optical frequency comb generator 110 communicatively coupled to beat generator circuitry 120 and error measurement and control circuitry 130.

The optical frequency comb generator 110 may be configured to provide an optical frequency comb. An optical frequency comb is a series of discrete, nearly equally spaced, optical frequency tones. An optical frequency comb may be generated through wave modulation or stabilization of a pulse train, or other technique. The beat generator circuitry 120 may be configured to extract a beat tone from the optical frequency comb provided by the optical frequency comb generator 110. The beat tone may then be used by the error measurement and control circuitry 130. The error measurement and control circuitry 130 may be configured to receive the beat tone and a carrier envelope offset (CEO) of the optical frequency comb, determine an error based upon reference signals, and/or provide a set of control signals for actuators of the optical frequency comb generator 110. The control signals may constrain the optical frequency comb generator 110 to produce a frequency comb with a specified number of beats at a specified offset and within a specified acceptable range of error.

An item referred to as "circuitry" includes electric and/or electronic components (e.g., one or more transistors, resistors, inductors, capacitors, diodes, oscillators, multiplexers, regulators, power supplies, rectifiers, analog to digital converters, digital to analog converters, radios, antennas, logic gates (e.g., AND, NAND, OR, NOR, NEGATE, or the like), portions of an FPGA, an ASIC, or the like), or other hardware. For example, the error measurement and control circuitry 130 may include one or more transistors, resistors, inductors, capacitors, diodes, oscillators, multiplexers, regulators, power supplies, rectifiers, analog to digital converters, digital to analog converters, radios, antennas, logic gates (e.g., AND, NAND, OR, NOR, NEGATE, or the like), portions of an FPGA, an ASIC, a computer-readable medium coupled to a processor, or the like, configured to perform operations of the error measurement and control circuitry 130. Other circuitry discussed herein may be configured similarly.

The beat generator circuitry 120 may be configured to receive the optical frequency comb from the optical frequency comb generator 110. The optical frequency comb may be received by an optical circulator 121 of the beat generator circuitry 120. The optical circulator 121 may be configured to provide the optical frequency comb to a Fiber Bragg grating 122. The Fiber Bragg grating 122 may be configured to reflect a limited set of comb teeth of the optical frequency comb back into the optical circulator 121. The optical circulator 121 may be configured to provide this comb tooth set to a coupler 123. The coupler 123 may be configured to sum the single comb tooth and a frequency stabilized laser to provide a beat tone combined with the carrier envelope offset.

The error measurement and control circuitry 130 may be configured to receive a first signal and a second signal. The first signal may include the beat tone combined with the carrier envelope offset provided by the coupler 123 of the beat generator 120. The second signal may include the carrier envelope offset. The first and second signals may be received by the comb error measurement circuitry 140 of the error measurement and control circuitry 130. The carrier envelope offset may be provided from the optical frequency comb using an f-to-2f interferometer, such as may be part of the beat generator circuitry 120.

The comb error measurement circuitry 140, as illustrated, includes mixer circuitry 141. The mixer circuitry 141 may mix the first signal and the second signal. In mixing the first and second signals, a carrier envelope offset may be separated from the beat tone. The separated beat tone signal and carrier envelope offset signal may be provided by the mixer circuitry 141. The beat tone signal may be provided to the beat tone digital phase detector 142. The carrier envelope offset may be provided to the carrier envelope offset digital phase detector 143.

The beat tone digital phase detector 142 may be configured to receive the beat tone and provide a beat tone error signal based on the received beat tone. In some embodiments, the beat tone digital phase detector 142 may use quadrature demodulation to provide the beat tone error signal.

The carrier envelope offset tone digital phase detector 143 may be configured to receive a carrier envelope offset tone and provide the carrier envelope offset error signal based on the received carrier envelope offset tone. In some embodiments, the carrier envelope offset tone digital phase detector 143 may use quadrature demodulation to provide the carrier envelope offset error signal. The beat tone error signal and carrier envelope offset error signal may be provided to repetition rate control circuitry 150 and carrier envelope control circuitry 160, respectively.

The repetition rate control circuitry 150, as illustrated, includes slow control circuitry 151 and fast control circuitry 152. The repetition rate control circuitry 150 may be configured to receive the beat tone error signal. The slow control circuitry 151 may provide a slow beat tone control signal based on the beat tone error signal. The fast control circuitry 152 may provide a fast beat tone control signal based on the beat tone error signal. In some embodiments, the repetition rate control circuitry 150 may be configured to use feedback control circuitry to provide the slow and fast beat tone control signals. The feedback control circuitry may include an integral-lead control, a proportional-integral-derivative control, a lead-lag controller, or other feedback control circuitry. The optical frequency comb generator 110 may be configured to receive the slow and fast repetition rate controls from the repetition rate control circuitry 150.

As used herein, "slow" and "fast" are used relative to one another. For example, slow control circuitry 151 provides a control signal slower than a control signal provided by the fast control circuitry 152.

The carrier envelope offset control circuitry 160 as illustrated includes slow control circuitry 161 and fast control circuitry 162. The carrier envelope offset control circuitry 160 may be configured to receive the carrier envelope offset error signal. The slow control circuitry 161 may provide a slow carrier envelope offset control signal based on the received carrier envelope offset error signal. The fast control circuitry 162 may provide a fast carrier envelope offset control signal based on the received carrier envelope offset signal. In some embodiments, the carrier envelope offset control circuitry 160 may be configured to use feedback control circuitry to provide the slow and fast carrier envelope offset control signals. The feedback control circuitry may include an integral-lead control, a proportional-integral-derivative control, a lead-lag controller, or other feedback control circuitry. The optical frequency comb generator 110 may be configured to receive the slow and fast carrier envelope offset control signals from the carrier envelope offset control circuitry 160.

In some embodiments, the comb error measurement circuitry 140, repetition rate control circuitry 150, and carrier envelope offset control circuitry 160 may be part of a single unit. The single unit may include a printed circuit board, a system on a chip, a field-programmable gate array, or other electronic system, such as may include circuitry contained in a package. By including the error measurement and control circuitry 130 in a single electronic package, the size and weight of the optical frequency comb locking system 100? may be significantly reduced compared to large laboratory systems currently used for optical frequency comb locking. Also, the power consumption of the error measurement and control circuitry 130 may be reduced relative to other error measurement and control circuitry of other optical frequency comb locking systems.

Figure 2:
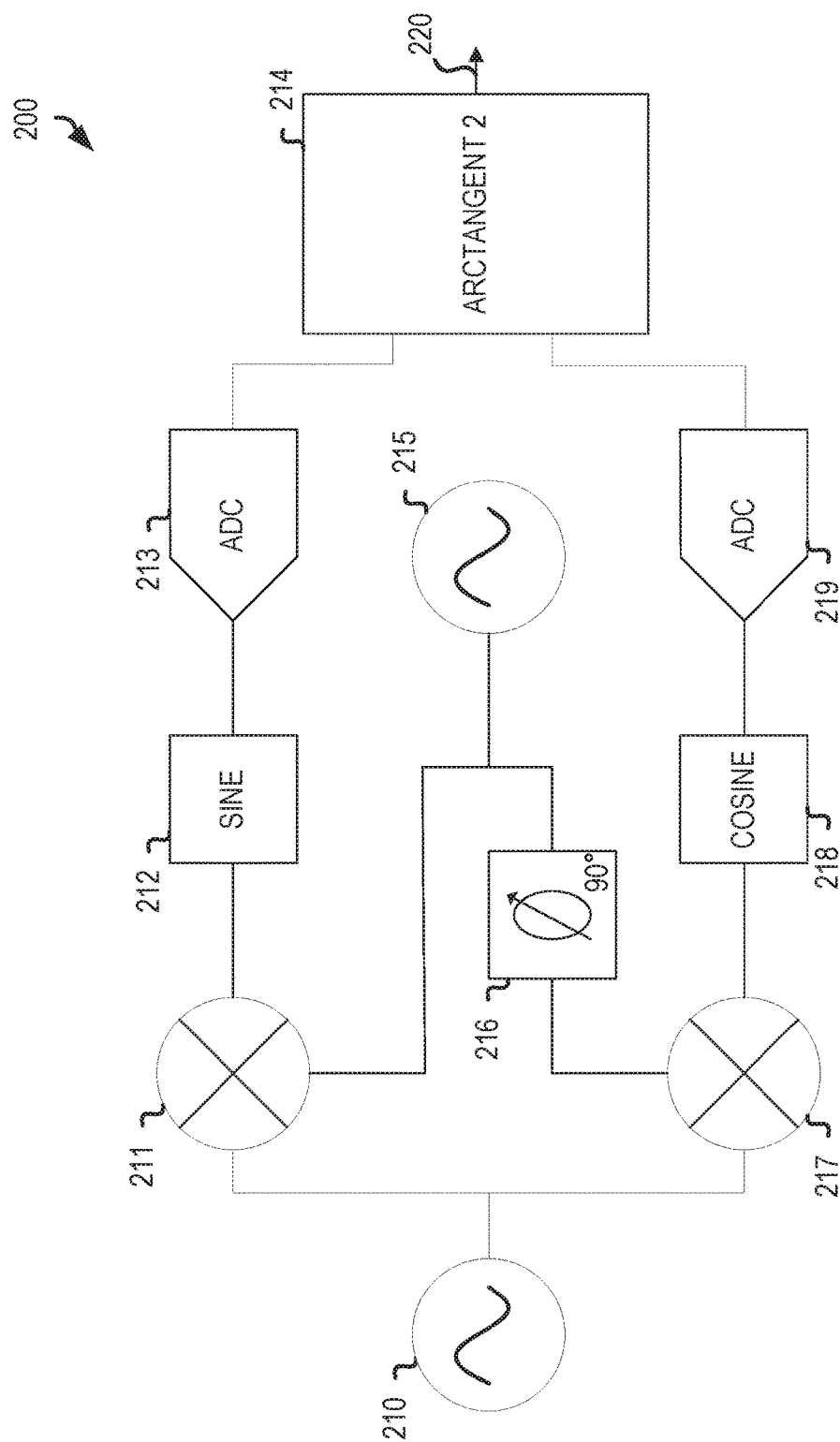
FIG. 2 illustrates, by way of example, a diagram of an embodiment of comb error measurement circuitry.

FIG. 2 illustrates, by way of example, a diagram of an embodiment of quadrature demodulation circuitry 200. The quadrature demodulation circuitry may provide a phase error measurement 220 of an input signal 210. The quadrature demodulation circuitry 200 illustrated may be a part of the beat tone digital phase detector 142 and/or the carrier envelope offset tone digital phase detector 143 of FIG. 1 in some embodiments.

An I-component mixer 211 mixes the input signal 210 with a reference signal generated from a local oscillator 215. The I-component mixed signal is then provided to sine circuitry 212. The sine circuitry 212 multiplies a sine function with the I-component signal. After the sine circuitry 212, the signal may be sampled by an analog-to-digital converter 213, to create a digitized I-component signal. The digitized I-component signal then goes to an arctangent 2 block 214, explained further below.

A Q-component mixer 217 mixes the input signal 210 with a ninety-degree shifted reference signal generated from a local oscillator 215 and a phase shifter 216. The Q-component signal is provided to cosine circuitry 218. The cosine circuitry multiplies the Q-component signal by a cosine function. After the cosine circuitry 218, the Q-component signal is sampled by an analog-to-digital converter 219, to produce a digitized Q-component signal. The digitized Q-component signal is provided to the arctangent 2 circuitry 214.

The arctangent 2 circuitry 214 is configured to receive the digitized I-component and Q-component signals. The arctangent 2 circuitry 214 performs an arctangent 2 function on the I-component and Q-component signals. The arctangent 2 circuitry 214 provides a phase difference 220 based on the I-component and Q-component signals, which is an error measurement. The phase difference 220 may be the beat tone error and/or the carrier envelope offset error from FIG. 1. The arctangent 2 function is an arctangent based on two inputs. The arctangent 2 function provides an angle (in radians) between the x-axis and a point defined by the two inputs.

Figure 3:
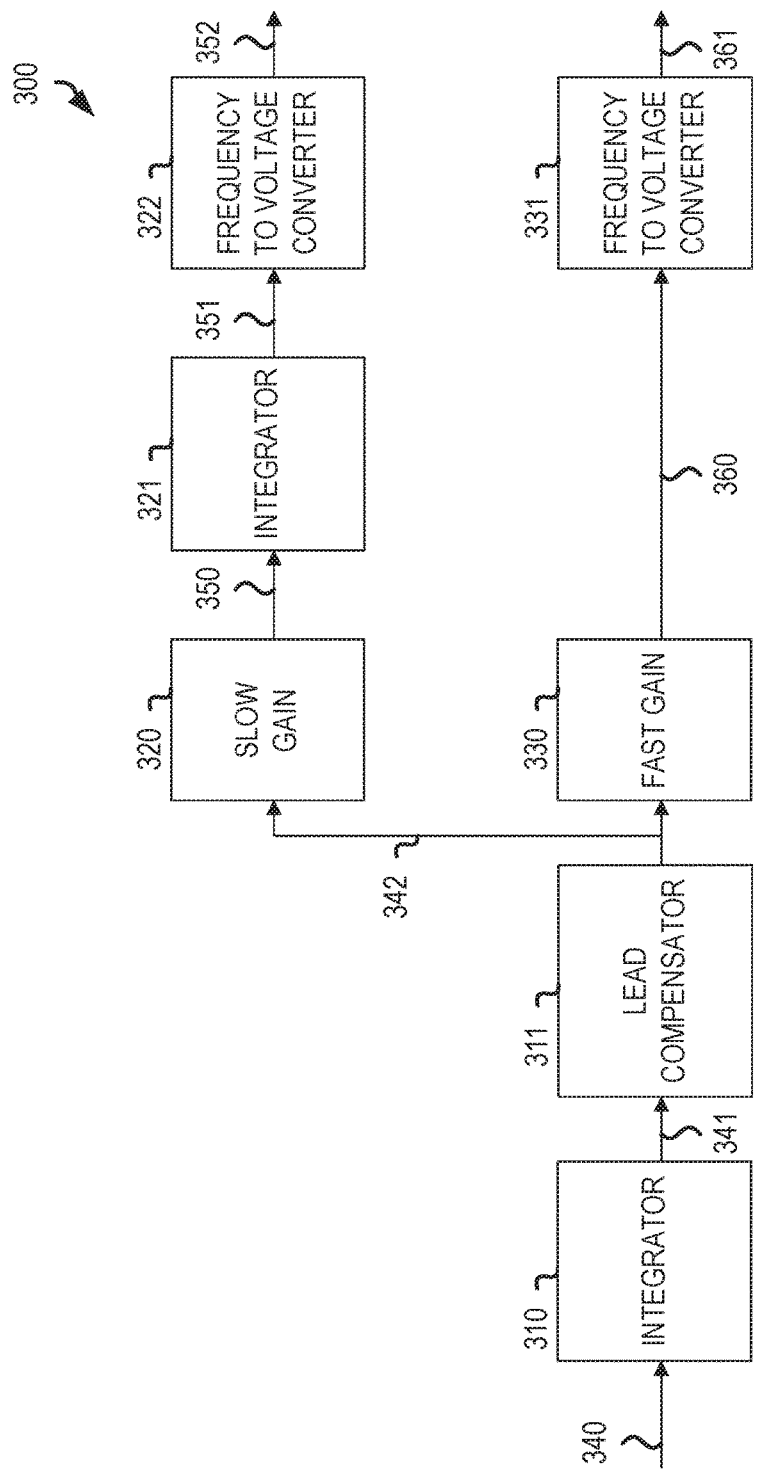
FIG. 3 illustrates, by way of example, a logical block diagram of an embodiment of control circuitry.

FIG. 3 illustrates, by way of example, a logical block diagram of an embodiment of control circuitry 300. The control circuitry 300 may be used for locking the optical frequency comb generator 110, such as to cause the optical frequency comb generator 110 to produce an optical frequency with one or more specific characteristics. The control circuitry 300 may be a part of the repetition rate control circuitry 150 and/or the carrier envelope offset control circuitry 160 of FIG. 1. The control circuitry 300 may be configured to receive an error measurement 340, such as from a digital phase detector (e.g., the beat tone digital phase detector 142 and/or the CEO tone digital phase detector 143). The error measurement 340 may include a beat tone error signal, and/or a carrier envelope offset error signal. The control circuitry 300 includes integrator circuitry 310 in series with lead compensator circuitry 311. The error measurement 340 is received by the integrator circuitry 310. The integrator circuitry 310 provides integrator control to the error measurement 340. In some embodiments, the integrator 310 is a split integrator. The integrator circuitry 310 provides an integrator control signal 341 to the lead compensator circuitry 311. The lead compensator circuitry 311 provides lead compensation to the signal and provides an integral-lead control signal 342.

The integral-lead control signal 342 may be provided to slow gain circuitry 320 and fast gain circuitry 330. The slow gain circuitry 320 as illustrated is in series with integrator circuitry 321 and frequency-to-voltage converter circuitry 322. The slow gain circuitry 320 may apply a proportional gain to the integral-lead control signal and provides a slow gain output signal 350 to the integrator circuitry 321. The integrator circuitry 321 provides further integration control and provides an integrated slow gain output signal 351 to the frequency-to-voltage converter circuitry 322. The frequency-to-voltage converter 322 converts a frequency of the integrated slow gain output signal 351 to a proportional voltage, sometimes referred to as a slow control signal 352. The slow control signal 352 may be a slow repetition rate control signal and/or a slow carrier envelope offset control signal mentioned in FIG. 1. The slow gain circuitry 320, integrator circuitry 321, and/or frequency to voltage converter 322 may be part of the slow control 151 and/or 161.

The fast gain circuitry 330 as illustrated is in series with a frequency-to-voltage converter 331. The fast gain circuitry 330 applies a proportional gain to the integral-lead control signal 342 and provides a fast integral-lead signal 360 to the frequency-to-voltage converter 331. The frequency-to-voltage converter 331 converts a frequency of the fast integral-lead signal 360 to a proportional voltage, sometimes referred to as a fast control signal 361. The fast control signal 361 may be the fast repetition rate control signal and/or the fast carrier envelope offset control signal mentioned in FIG. 1. The fast gain circuitry 330 and/or frequency to voltage converter 331 may be part of the fast control 152 and/or 162.

Figure 4:
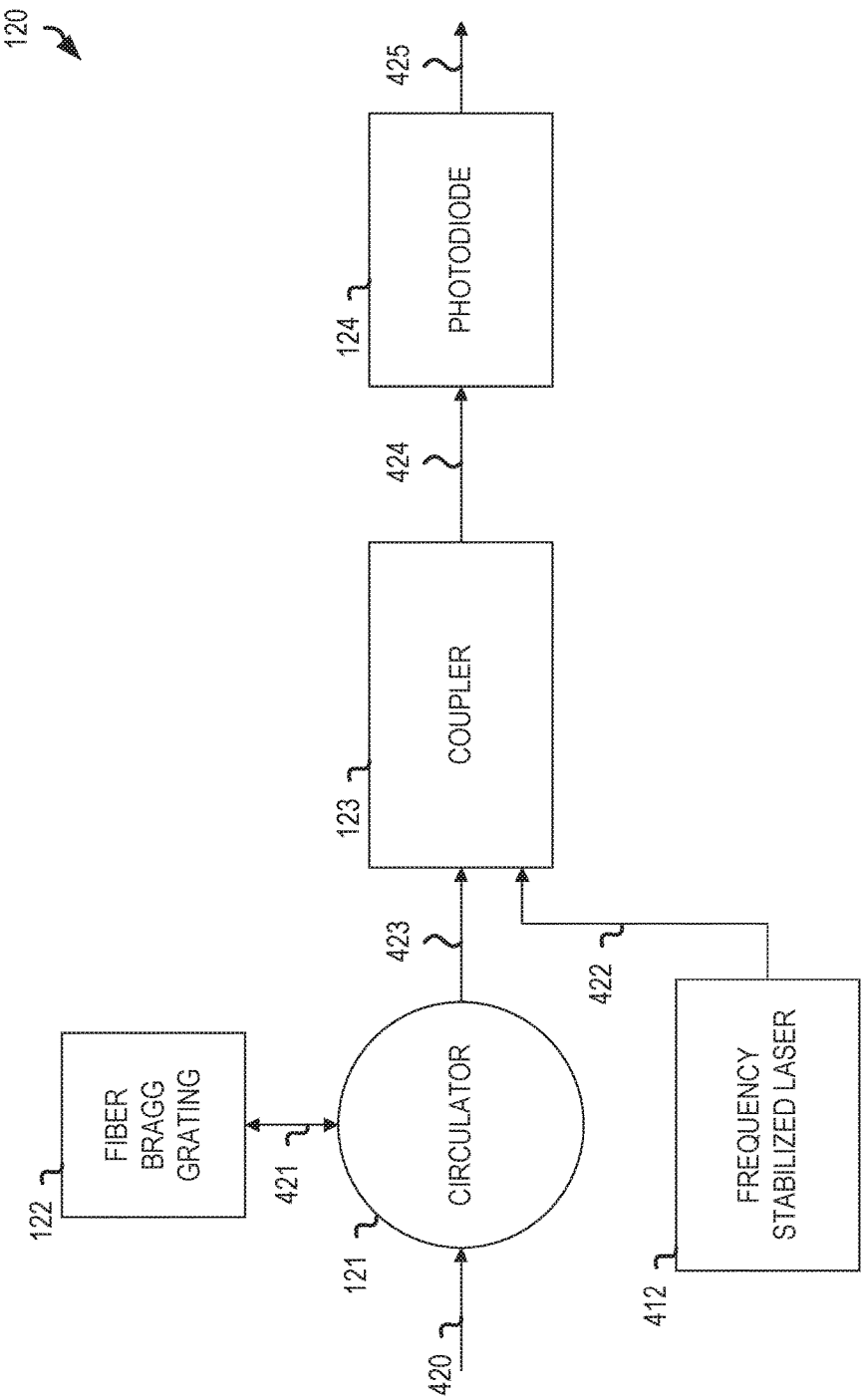
FIG. 4 illustrates, by way of example, a diagram of an embodiment of beat generation circuitry.

FIG. 4 illustrates, by way of example, a diagram of an embodiment of beat generator circuitry 120. The beat generation circuitry generates a beat tone, such as based on an optical frequency comb. The beat generation circuitry 120 is configured to receive an optical frequency comb using a first port 420 of the optical circulator 121. The optical frequency comb is transmitted to a sensor (e.g., Fiber Bragg grating 122) using a second port 421 of the optical circulator 121. The Fiber Bragg grating 122 may be configured to return a single tooth of the optical frequency comb using the second port 421 of the optical circulator 121. The single tooth of the optical frequency comb is provided to an optical coupler 123 using a third port 423 of the optical circulator 121. The optical coupler 123 optically mixes the single tooth of the optical frequency comb with an optical signal 422 of a frequency stabilized laser 412 to provide a mixed optical signal 424. The mixed optical signal 424 is received by the photodiode 124 and converted into an electrical signal 425. The electrical signal 425 is the beat tone mixed with the carrier envelope offset of FIG. 1 and FIG. 2.

Figure 5:
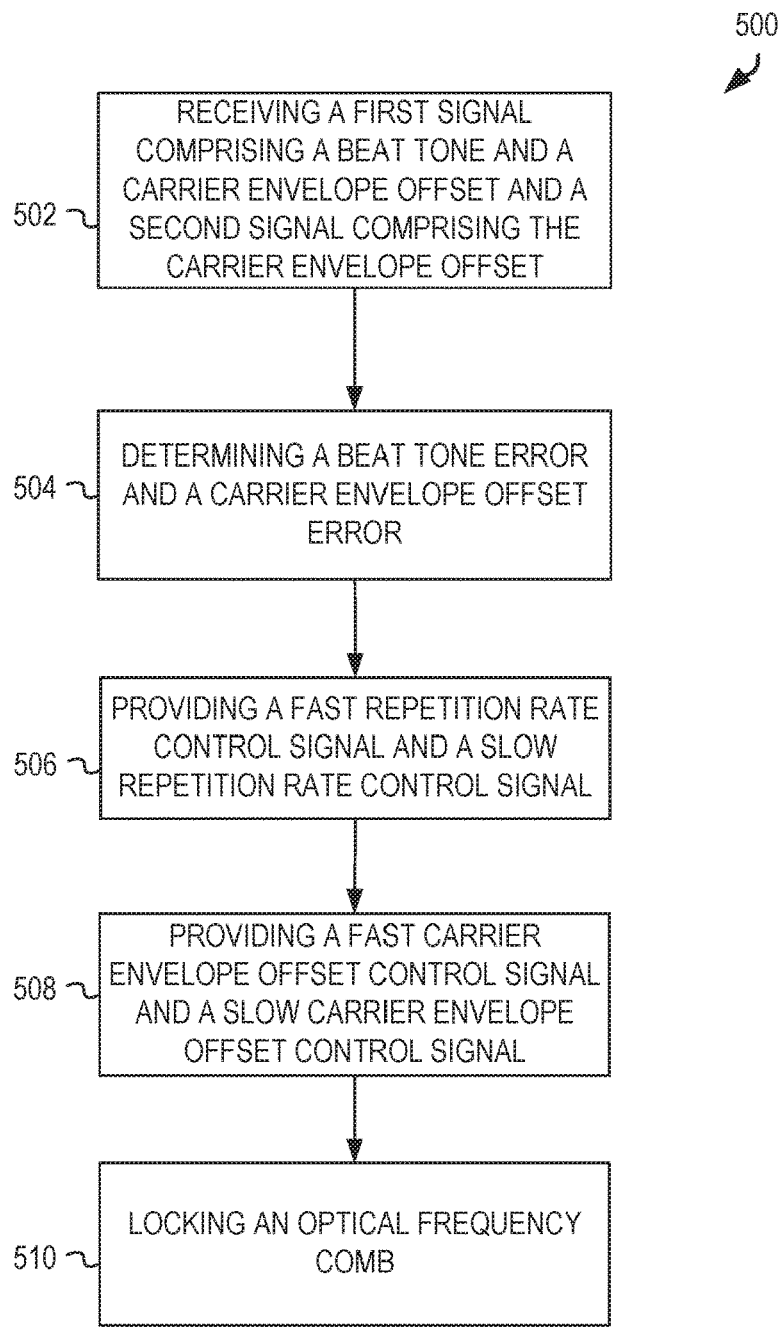
FIG. 5 illustrates, by way of example, a flow diagram of an embodiment of a method for controlling an optical frequency comb generator.

FIG. 5 illustrates, by way of example, a flow diagram of an embodiment of a method 500. At operation 502, as illustrated a first signal comprising a beat tone and a carrier envelope offset corresponding to an optical frequency comb and a second signal comprising the carrier envelope offset are received. The first and second signals may be generated from the optical frequency comb. The first signal may be provided from a combination of a single tooth of the optical frequency comb and a frequency stabilized laser.

At operation 504, as illustrated, a beat tone error and a carrier envelope offset error are determined using comb error measurement circuitry and the first and second signal. The carrier envelope offset may be mixed out of the first signal using mixer circuitry and the second signal, thereby, providing the beat tone and the carrier envelope offset separately. The beat tone error and carrier envelope offset error may then be determined using quadrature demodulation on the beat tone and the carrier envelope offset, respectively.

At operation 506, as illustrated, a fast repetition rate control signal and a slow repetition rate control signal are provided. The fast repetition rate control signal and the slow repetition rate control signal may be provided using repetition rate control circuitry and the beat tone error. The integral-lead control signal may be applied to the beat tone error, after which the result may be used by slow repetition rate control circuitry and fast repetition rate control circuitry. The fast repetition rate control circuitry applies a gain, and converts the result from a frequency to a voltage providing the fast repetition rate control signal. The slow repetition rate circuitry applies a gain in series with integration, and then converts the result from frequency to voltage providing the slow repetition rate control signal.

At operation 508, as illustrated, a fast carrier envelope offset control signal and a slow carrier envelope offset control signal are provided using carrier envelope offset control circuitry and the carrier envelope offset error. The integral-lead control may be applied to the carrier envelope offset error, after which the result may be used by slow carrier envelope offset control circuitry and fast carrier envelope offset control circuitry. The fast carrier envelope offset control circuitry applies a gain, and converts the result from a frequency to a voltage providing the fast carrier envelope offset control. The slow carrier envelope offset circuitry applies a gain in series with an integration, and then converts the result from frequency to voltage providing the slow carrier envelope offset control signal?.

At operation 510, as illustrated, the optical frequency comb is locked using an optical frequency comb generator, the fast repetition rate control signal, the slow repetition rate control signal, the fast carrier envelope offset control signal, and the slow carrier envelope offset control signal. The control signals may each control an actuator of the optical frequency comb generator to lock the optical frequency comb.

Figure 6:
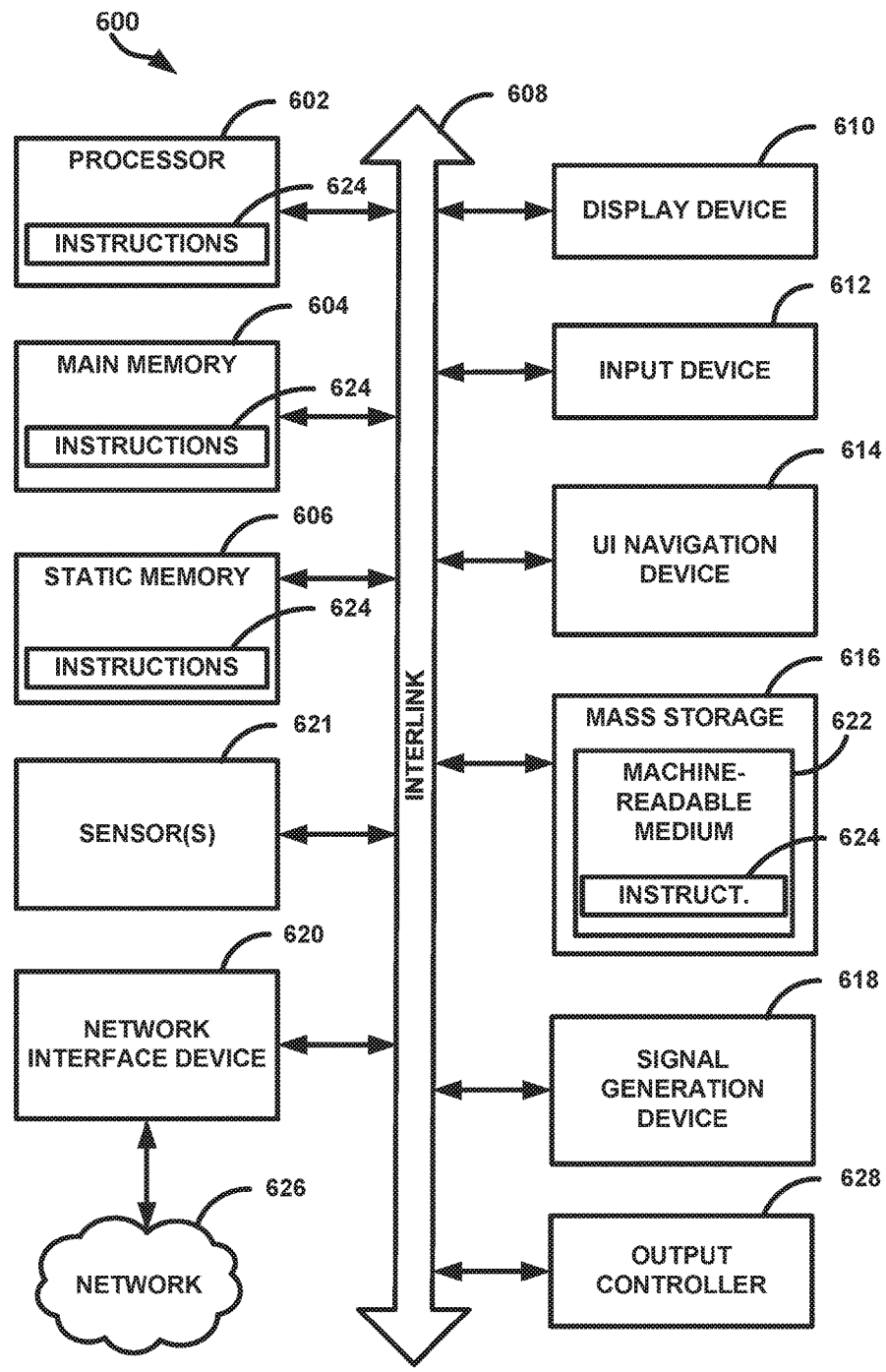
FIG. 6 illustrates, by way of example, a block diagram of an embodiment of a machine on which one or more of the methods as discussed herein can be implemented.

FIG. 6 illustrates, by way of example, a block diagram of an embodiment of a machine 600 on which one or more of the methods as discussed herein can be implemented. In one or more embodiments, one or more items of the beat generator circuitry 120, error measurement and control circuitry 130, and optical frequency comb generator 110 may be implemented by the machine 600. In alternative embodiments, the machine 600 operates as a standalone device or may be connected (e.g., networked) to other machines. In one or more embodiments, one or more items of the beat generator circuitry 120, error measurement and control circuitry 130, and optical frequency comb generator 110 can include one or more of the items of the machine 600. In a networked deployment, the machine 600 may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example machine 600 includes processing circuitry 602 (e.g., a central processing unit (CPU), a graphics processing unit (GPU), an application specific integrated circuit, circuitry, such as one or more transistors, resistors, capacitors, inductors, diodes, logic gates, multiplexers, buffers, modulators, demodulators, radios (e.g., transmit or receive radios or transceivers), sensors 621 (e.g., a transducer that converts one form of energy (e.g., light, heat, electrical, mechanical, or other energy) to another form of energy), or the like, or a combination thereof), a main memory 604 and a static memory 606, which communicate with each other via a bus 608. The machine 600 (e.g., computer system) may further include a video display unit 610 (e.g., a liquid crystal display (LCD) or a cathode ray tube (CRT)). The machine 600 also includes an alphanumeric input device 612 (e.g., a keyboard), a user interface (UI) navigation device 614 (e.g., a mouse), a disk drive or mass storage unit 616, a signal generation device 618 (e.g., a speaker) and a network interface device 620.

The disk drive unit 616 includes a machine-readable medium 622 on which is stored one or more sets of instructions and data structures (e.g., software) 624 embodying or utilized by any one or more of the methodologies or functions described herein. The instructions 624 may also reside, completely or at least partially, within the main memory 604 and/or within the processor 602 during execution thereof by the machine 600, the main memory 604 and the processor 602 also constituting machine-readable media.

The machine 600 as illustrated includes an output controller 628. The output controller 628 manages data flow to/from the machine 600. The output controller 628 is sometimes called a device controller, with software that directly interacts with the output controller 628 being called a device driver.

While the machine-readable medium 622 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 624 may further be transmitted or received over a communications network 626 using a transmission medium. The instructions 624 may be transmitted using the network interface device 620 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Embodiments and Additional Notes

Embodiment 1 includes a system for locking an optical frequency comb comprising: error measurement and control circuitry configured to receive a first signal comprising a beat tone and a carrier envelope offset corresponding to the optical frequency comb and a second signal comprising the carrier envelope offset and provide a fast repetition rate control, a slow repetition rate control, a fast carrier envelope control, and a slow carrier envelope control for locking an optical frequency comb, wherein the error measurement and control circuit includes: comb error measurement circuitry configured to receive the first and second signal, and to provide a beat tone error and a carrier envelope offset error; repetition rate control circuitry configured to receive the beat tone error signal and to provide a fast repetition rate control and a slow repetition rate control for locking the beat tone of the optical frequency comb; carrier envelope offset control circuitry configured to receive a carrier envelope offset error and to provide a fast envelope offset control and a slow envelope offset control for locking the carrier envelope offset of the optical frequency comb.

In Embodiment 2, the subject matter of Embodiment 1 optionally includes wherein the comb error measurement circuitry includes: mixer circuitry configured to mix the carrier envelope offset out of the first signal using the first and second signal, and to provide the beat tone and the carrier envelope offset; beat tone digital phase detector circuitry configured to receive the beat tone, to use quadrature demodulation to detect a phase difference between a reference signal and the beat tone and a reference signal generated by a local oscillator, and to provide the beat tone error; carrier envelope offset digital phase detector circuitry configured to receive the carrier envelope offset, to use quadrature demodulation to detect a phase difference between the carrier envelope offset and the reference signal generated by the local oscillator, and to provide the carrier envelope offset error.

In Embodiment 3, the subject matter of Embodiment 2 optionally includes wherein the beat tone digital phase detector circuitry includes: a mixing circuit to mix the beat tone with a first reference signal and second reference signal generated from the local oscillator to produce a first mixed signal and a second mixed signal; an analog-to-digital converter to sample the first mixed signal and the second mixed signal to provide a first mixed digital signal and a second mixed digital signal; and arctangent 2 circuitry configured to receive the first and second mixed digital signals, to perform an arctangent 2 operation on the first and second mixed signals, and to provide the result of the arctangent 2 operation as the beat tone error.

In Embodiment 4, the subject matter of any one or more of Embodiments 1-3 optionally include wherein the repetition rate control circuit includes: integral-lead control circuitry configured to apply integral-lead control to the beat tone error and provide an integral-lead repetition rate control; fast repetition rate control circuitry configured to apply proportional gain control and a frequency-to-voltage conversion to the integral-lead repetition rate control to provide the fast repetition rate control; and slow repetition rate control circuitry configured to apply proportional gain control, integration control, and a frequency-to-voltage conversion to the integral-lead repetition rate control to provide the slow repetition rate control.

In Embodiment 5, the subject matter of any one or more of Embodiments 1-4 optionally include wherein the carrier envelope offset control circuit includes: integral-lead control circuitry configured to apply integral-lead control to the beat tone error and provide an integral-lead carrier envelope offset control; fast carrier envelope offset control circuitry configured to apply proportional gain control and a frequency-to-voltage conversion to the integral-lead carrier envelope offset control to provide the fast carrier envelope offset control; and slow carrier envelope offset control circuitry configured to apply proportional gain control, integration control, and a frequency-to-voltage conversion to the integral-lead carrier envelope offset control to provide the slow carrier envelope offset control.

In Embodiment 6, the subject matter of any one or more of Embodiments 1-5 optionally include an optical frequency comb generator to use the fast repetition rate control, the slow repetition rate control, the fast carrier envelope offset control, and the slow carrier envelope offset control to provide a locked optical frequency comb.

In Embodiment 7, the subject matter of Embodiment 6 optionally includes a beat generator to use a single comb tooth of the optical frequency comb and a frequency stabilized laser to provide the first signal.

In Embodiment 8, the subject matter of any one or more of Embodiments 1-7 optionally include wherein the comb error measurement circuitry, the repetition rate control circuitry, and the carrier envelope offset control circuitry are implemented in a single field-programmable gate array.

Embodiment 9 includes a method for locking an optical frequency comb comprising: receiving, using error measurement and control circuitry, a first signal comprising a beat tone and a carrier envelope offset corresponding to the optical frequency comb and a second signal comprising the carrier envelope offset; determining, using comb error measurement circuitry and the first and second signal, a beat tone error and a carrier envelope offset error; providing, using repetition rate control circuitry and the beat tone error, a fast repetition rate control and a slow repetition rate control for locking the beat tone of the optical frequency comb; and providing, using carrier envelope offset control circuitry and the carrier envelope offset error, a fast repetition rate control and a slow repetition rate control for locking the carrier envelope offset of the optical frequency comb.

In Embodiment 10, the subject matter of Embodiment 9 optionally includes wherein determining the beat tone error and the carrier envelope offset error includes: mixing the carrier envelope offset out of the first signal using mixing circuitry, the first signal, and the second signal; determining the beat tone error using beat tone digital phase detector circuitry, quadrature demodulation, and the beat tone; determining the carrier envelope offset error using carrier envelope phase detector circuitry, quadrature demodulation, and the carrier envelope offset tone.

In Embodiment 11, the subject matter of Embodiment 10 optionally includes wherein determining the beat tone error using quadrature demodulation to includes: mixing, using mixer circuitry, the beat tone with a first signal generated from a local oscillator to create a first mixed signal; mixing, using mixer circuitry, the beat tone with a second signal from the local oscillator, the second signal ninety-degrees out of phase with the first signal; sampling, using an analog to digital converter circuit, the first mixed signal and the second mixed signal to generate a first digital mixed signal and a second digital mixed signal; and determining the beat tone error, using an arctangent 2 circuitry, to perform an arctangent 2 function on the first and second digital mixed signals.

In Embodiment 12, the subject matter of any one or more of Embodiments 9-11 optionally include wherein providing the fast and slow repetition rate control includes: determining an integral-lead loop control using integral-lead circuitry and the beat tone error; determining the fast repetition rate control using fast gain circuitry and frequency-to-voltage converter circuitry; and determining the slow repetition rate control using slow gain circuitry, integration circuitry, and frequency-to-voltage converter circuitry.

In Embodiment 13, the subject matter of any one or more of Embodiments 9-12 optionally include wherein providing the fast and slow carrier envelope offset control includes: determining an integral-lead loop control using integral-lead circuitry and the carrier envelope offset error; determining the fast carrier envelope offset control using fast gain circuitry and frequency-to-voltage converter circuitry; and determining the slow carrier envelope offset control using slow gain circuitry, integration circuitry, and frequency-to-voltage converter circuitry.

In Embodiment 14, the subject matter of any one or more of Embodiments 9-13 optionally include locking an optical frequency comb using an optical frequency comb generator, the fast repetition rate control, the slow repetition rate control, the fast carrier envelope offset control, and the slow carrier envelope offset control.

In Embodiment 15, the subject matter of any one or more of Embodiments 9-14 optionally include wherein the using comb error measurement circuitry, the repetition rate control circuitry, and the carrier envelope offset control circuitry are implemented using a field-programmable gate array.

Embodiment 16 includes at least one machine-readable medium for locking an optical frequency comb, the machine-readable medium including instructions, which when performed by a machine causes the machine to execute an optical frequency comb locking process that performs operations comprising: receiving, using error measurement and control circuitry, a first signal comprising a beat tone and a carrier envelope offset corresponding to the optical frequency comb and a second signal comprising the carrier envelope offset; determining, using comb error measurement circuitry and the first and second signal, a beat tone error and a carrier envelope offset error; providing, using repetition rate control circuitry and the beat tone error, a fast repetition rate control and a slow repetition rate control for locking the beat tone of the optical frequency comb; and providing, using carrier envelope offset control circuitry and the carrier envelope offset error, a fast repetition rate control and a slow repetition rate control for locking the carrier envelope offset of the optical frequency comb.

In Embodiment 17, the subject matter of Embodiment 16 optionally includes the operations further comprising: mixing the carrier envelope offset out of the first signal using mixing circuitry, the first signal, and the second signal; determining the beat tone error using beat tone digital phase detector circuitry, quadrature demodulation, and the beat tone; determining the carrier envelope offset error using carrier envelope phase detector circuitry, quadrature demodulation, and the carrier envelope offset tone.

In Embodiment 18, the subject matter of Embodiment 17 optionally includes wherein determining the beat tone error using quadrature demodulation to includes: mixing, using mixer circuitry, the beat tone with a first signal generated from a local oscillator to create a first mixed signal; mixing, using mixer circuitry, the beat tone with a second signal from the local oscillator, the second signal ninety-degrees out of phase with the first signal; sampling, using an analog to digital converter circuit, the first mixed signal and the second mixed signal to generate a first digital mixed signal and a second digital mixed signal; and determining the beat tone error, using an arctangent 2 circuitry, to perform an arctangent 2 function on the first and second digital mixed signals.

In Embodiment 19, the subject matter of any one or more of Embodiments 16-18 optionally include wherein providing the fast and slow repetition rate control includes: determining an integral-lead loop control using integral-lead circuitry and the beat tone error; determining the fast repetition rate control using fast gain circuitry and frequency-to-voltage converter circuitry; and determining the slow repetition rate control using slow gain circuitry, integration circuitry, and frequency-to-voltage converter circuitry.

In Embodiment 20, the subject matter of any one or more of Embodiments 16-19 optionally include wherein providing the fast and slow carrier envelope offset control includes: determining an integral-lead loop control using integral-lead circuitry and the carrier envelope offset error; determining the fast carrier envelope offset control using fast gain circuitry and frequency-to-voltage converter circuitry; and determining the slow carrier envelope offset control using slow gain circuitry, integration circuitry, and frequency-to-voltage converter circuitry.

In Embodiment 21, the subject matter of any one or more of Embodiments 16-20 optionally include the operations further comprising locking an optical frequency comb using an optical frequency comb generator, the fast repetition rate control, the slow repetition rate control, the fast carrier envelope offset control, and the slow carrier envelope offset control.

Although an embodiment has been described with reference to specific embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A system comprising:
   error measurement and control circuitry configured to receive a first signal comprising a beat tone and a carrier envelope offset corresponding to an optical frequency comb and a second signal comprising the carrier envelope offset and provide a fast repetition rate control, a slow repetition rate control, a fast carrier envelope control, and a slow carrier envelope control for locking an optical frequency comb, wherein the error measurement and control circuit includes:
   comb error measurement circuitry configured to receive the first and second signal, and to provide a beat tone error and a carrier envelope offset error;
   repetition rate control circuitry configured to receive the beat tone error signal and to provide a fast repetition rate control and a slow repetition rate control for locking the beat tone of the optical frequency comb; and
   carrier envelope offset control circuitry configured to receive a carrier envelope offset error and to provide a fast envelope offset control and a slow envelope offset control for locking the carrier envelope offset of the optical frequency comb.

2. The system of claim 1, wherein the comb error measurement circuitry includes:
   mixer circuitry configured to mix the carrier envelope offset out of the first signal using the first and second signal, and to provide the beat tone and the carrier envelope offset;
   beat tone digital phase detector circuitry configured to receive the beat tone, to use quadrature demodulation to detect a phase difference between a reference signal and the beat tone and a reference signal generated by a local oscillator, and to provide the beat tone error;
   carrier envelope offset digital phase detector circuitry configured to receive the carrier envelope offset, to use quadrature demodulation to detect a phase difference between the carrier envelope offset and the reference signal generated by the local oscillator, and to provide the carrier envelope offset error.

3. The system of claim 2, wherein the beat tone digital phase detector circuitry includes:
   a mixing circuit to mix the beat tone with a first reference signal and second reference signal generated from the local oscillator to produce a first mixed signal and a second mixed signal;

an analog-to-digital converter to sample the first mixed signal and the second mixed signal to provide a first mixed digital signal and a second mixed digital signal, and arctangent 2 circuitry configured to receive the first and second mixed digital signals, to perform an arctangent 2 operation on the first and second mixed signals, and to provide the result of the arctangent 2 operation as the beat tone error.

4. The system of claim 1, wherein the repetition rate control circuit includes:
    integral-lead control circuitry configured to apply integral-lead control to the beat tone error and provide an integral-lead repetition rate control;
    fast repetition rate control circuitry configured to apply proportional gain control and a frequency-to-voltage conversion to the integral-lead repetition rate control to provide the fast repetition rate control; and
    slow repetition rate control circuitry configured to apply proportional gain control, integration control, and a frequency-to-voltage conversion to the integral-lead repetition rate control to provide the slow repetition rate control.

5. The system of claim 1, wherein the carrier envelope offset control circuit includes:
    integral-lead control circuitry configured to apply integral-lead control to the beat tone error and provide an integral-lead carrier envelope offset control;
    fast carrier envelope offset control circuitry configured to apply proportional gain control and a frequency-to-voltage conversion to the integral-lead carrier envelope offset control to provide the fast carrier envelope offset control; and
    slow carrier envelope offset control circuitry configured to apply proportional gain control, integration control, and a frequency-to-voltage conversion to the integral-lead carrier envelope offset control to provide the slow carrier envelope offset control.

6. The system of claim 1, further including an optical frequency comb generator to use the fast repetition rate control, the slow repetition rate control, the fast carrier envelope offset control, and the slow carrier envelope offset control to provide a locked optical frequency comb.

7. The system of claim 6, further including a beat generator to use a single comb tooth of the optical frequency comb and a frequency stabilized laser to provide the first signal.

8. The system of claim 1, wherein the comb error measurement circuitry, the repetition rate control circuitry, and the carrier envelope offset control circuitry are implemented in a single field-programmable gate array.

9. A method for locking an optical frequency comb comprising:
    receiving, using error measurement and control circuitry, a first signal comprising a beat tone and a carrier envelope offset corresponding to the optical frequency comb and a second signal comprising the carrier envelope offset;
    determining, using comb error measurement circuitry and the first and second signal, a beat tone error and a carrier envelope offset error;
    providing, using repetition rate control circuitry and the beat tone error, a fast repetition rate control and a slow repetition rate control for locking the beat tone of the optical frequency comb; and
    providing, using carrier envelope offset control circuitry and the carrier envelope offset error, a fast repetition rate control and a slow repetition rate control for locking the carrier envelope offset of the optical frequency comb.

10. The method of claim 9, wherein determining the beat tone error and the carrier envelope offset error includes:
    mixing the carrier envelope offset out of the first signal using mixing circuitry, the first signal, and the second signal;
    determining the beat tone error using beat tone digital phase detector circuitry, quadrature demodulation, and the beat tone;
    determining the carrier envelope offset error using carrier envelope phase detector circuitry, quadrature demodulation, and the carrier envelope offset tone.

11. The method of claim 10, wherein determining the beat tone error using quadrature demodulation to includes:
    mixing, using mixer circuitry, the beat tone with a first signal generated from a local oscillator to create a first mixed signal;
    mixing, using mixer circuitry, the beat tone with a second signal from the local oscillator, the second signal ninety-degrees out of phase with the first signal;
    sampling, using an analog to digital converter circuit, the first mixed signal and the second mixed signal to generate a first digital mixed signal and a second digital mixed signal; and
    determining the beat tone error, using an arctangent 2 circuitry, to perform an arctangent 2 function on the first and second digital mixed signals.

12. The method of claim 9, wherein providing the fast and slow repetition rate control includes:
    determining an integral-lead loop control using integral-lead circuitry and the beat tone error;
    determining the fast repetition rate control using fast gain circuitry and frequency-to-voltage converter circuitry; and
    determining the slow repetition rate control using slow gain circuitry, integration circuitry, and frequency-to-voltage converter circuitry.

13. The method of claim 9, wherein providing the fast and slow carrier envelope offset control includes:
    determining an integral-lead loop control using integral-lead circuitry and the carrier envelope offset error;
    determining the fast carrier envelope offset control using fast gain circuitry and frequency-to-voltage converter circuitry, and
    determining the slow carrier envelope offset control using slow gain circuitry, integration circuitry, and frequency-to-voltage converter circuitry.

14. The method of claim 9, further comprising locking an optical frequency comb using an optical frequency comb generator, the fast repetition rate control, the slow repetition rate control, the fast carrier envelope offset control, and the slow carrier envelope offset control.

15. The method of claim 9, wherein the using comb error measurement circuitry, the repetition rate control circuitry, and the carrier envelope offset control circuitry are implemented using a field-programmable gate array.

16. At least one non-transitory machine-readable medium the machine-readable medium including instructions, which when performed by a machine, cause the machine to performs operations for locking an optical frequency comb, the operations comprising:
    receiving, using error measurement and control circuitry, a first signal comprising a beat tone and a carrier envelope offset corresponding to the optical frequency comb and a second signal comprising the carrier envelope offset;

determining, using comb error measurement circuitry and the first and second signal, a beat tone error and a carrier envelope offset error;

providing, using repetition rate control circuitry and the beat tone error, a fast repetition rate control and a slow repetition rate control for locking the beat tone of the optical frequency comb; and providing, using carrier envelope offset control circuitry and the carrier envelope offset error, a fast repetition rate control and a slow repetition rate control for locking the carrier envelope offset of the optical frequency comb.

17. The non-transitory machine-readable medium of claim 16, the operations further comprising:

mixing the carrier envelope offset out of the first signal using mixing circuitry, the first signal, and the second signal;

determining the beat tone error using beat tone digital phase detector circuitry, quadrature demodulation, and the beat tone;

determining the carrier envelope offset error using carrier envelope phase detector circuitry, quadrature demodulation, and the carrier envelope offset tone.

18. The non-transitory machine-readable medium of claim 17, wherein determining the beat tone error using quadrature demodulation to includes:

mixing, using mixer circuitry, the beat tone with a first signal generated from a local oscillator to create a first mixed signal;

mixing, using mixer circuitry, the beat tone with a second signal from the local oscillator, the second signal ninety-degrees out of phase with the first signal;

sampling, using an analog to digital converter circuit, the first mixed signal and the second mixed signal to generate a first digital mixed signal and a second digital mixed signal; and determining the beat tone error, using an arctangent 2 circuitry, to perform an arctangent 2 function on the first and second digital mixed signals.

19. The non-transitory machine-readable medium of claim 16, wherein providing the fast and slow repetition rate control includes:

determining an integral-lead loop control using integral-lead circuitry and the beat tone error;

determining the fast repetition rate control using fast gain circuitry and frequency-to-voltage converter circuitry; and determining the slow repetition rate control using slow gain circuitry, integration circuitry, and frequency-to-voltage converter circuitry.

20. The non-transitory machine-readable medium of claim 16, wherein providing the fast and slow carrier envelope offset control includes:

determining an integral-lead loop control using integral-lead circuitry and the carrier envelope offset error;

determining the fast carrier envelope offset control using fast gain circuitry and frequency-to-voltage converter circuitry; and determining the slow carrier envelope offset control using slow gain circuitry, integration circuitry, and frequency-to-voltage converter circuitry.

21. The non-transitory machine-readable medium of claim 16, the operations further comprising locking an optical frequency comb using an optical frequency comb generator, the fast repetition rate control, the slow repetition rate control, the fast carrier envelope offset control, and the slow carrier envelope offset control.

\* \* \* \* \*